United States Patent
Tang et al.

(10) Patent No.: US 6,770,681 B2
(45) Date of Patent: Aug. 3, 2004

(54) FOAMABLE COPOLYMER RESIN AND A METHOD FOR PREPARING THE SAME

(75) Inventors: Suoyun Tang, Hangzhou (CN); Guohua Lu, Hangzhou (CN); Xiaohong Han, Hangzhou (CN); Jingwu Hong, Hangzhou (CN)

(73) Assignee: Hangzhou Yuhang Yatai Chemical Industries Co., Ltd., Zhejiang (CN)

( * ) Notice: Subject to any disclaimer, the term of this patent is extended or adjusted under 35 U.S.C. 154(b) by 3 days.

(21) Appl. No.: 10/228,161

(22) Filed: Aug. 26, 2002

(65) Prior Publication Data

US 2003/0195265 A1 Oct. 16, 2003

(30) Foreign Application Priority Data

Apr. 16, 2002 (CN) ......................................... 02118011 A

(51) Int. Cl.$^7$ .............................. C08J 9/18; B22C 1/22; B22C 7/00
(52) U.S. Cl. ........................... 521/56; 164/34; 164/246; 521/59; 521/60; 526/201
(58) Field of Search .............................. 521/56, 59, 60; 164/34, 246; 526/201

(56) References Cited

U.S. PATENT DOCUMENTS

| | | |
|---|---|---|
| 5,403,866 A | 4/1995 | Kato et al. ..................... 521/98 |
| 6,303,664 B1 * | 10/2001 | Sonnenberg et al. |
| 6,360,807 B2 | 3/2002 | Sonnenberg et al. .......... 164/34 |
| 6,497,269 B2 * | 12/2002 | Sonnenberg et al. |

* cited by examiner

*Primary Examiner*—Morton Foelak
(74) *Attorney, Agent, or Firm*—Ladas & Parry

(57) ABSTRACT

The application relates to a foamable copolymer resin and a process for preparing the same, which comprises firstly adding an organic peroxide initiator, a modifying aid and a foaming agent to a mixed monomers of methyl methacrylate and styrene so as to constitute a homogenous mixture; at the same tine charging a deionized water into a polymerization reactor and adding a dispersant hydroxy ethyl cellulose or hydroxylpropyl cellulose ether with stirring to produce a homogenous mixture, then sealing the reactor and introducing $N_2$ gas to purge the reactor before the above homogenous monomer mixture is added; after the completion of the reaction the residue is washed with water and dewatered and dried, obtaining foamable pellets.

20 Claims, No Drawings

FOAMABLE COPOLYMER RESIN AND A METHOD FOR PREPARING THE SAME

TECHNICAL FIELD

The application relates to a novel foamable copolymer resin (i.e. StMMA) and a method for preparing the same, which resin is a new plastic molding material for producing eliminated pattern (lost foam) castings. The invention concerns the field of manufacturing lost foam casting molding materials.

BACKGROUND ART

From U.S. Pat. No. 5,403,866 is known a foamable resin composition which comprises a copolymer produced by copolymerizing 55–85% by weight, preferably 60–80% by weight, of styrene and 45–15% by weight, preferably 40–20% by weight, of methacrylic acid. The prior art document has some disadvantages, since tricalcium phosphate is used as main dispersant during the reaction and has to be treated with hydrochloric acid after the completion of the reaction, not only the difficulties of acid treatment are brought but also the amount of waste water is increased greatly; secondly, the foamable resin is prepared by "two-step process" and the foaming agent is added at a pressure in the middle of the reaction. Therefore, there are needed a plenty of apparatus investment and the operation is very complicated, resulting in a ery high production cost.

U.S. Pat. No. 6,360,807 discloses an expandable styrenic copolymer comprising from 50 to 90 percent by weight of methyl methacrylate and from 10 to 50 percent by weight of styrene. However, there are still defects present during the preparation of the copolymer resin by means of "one-step process": the molecular weight is lower and the resultant resin foam (pattern) has a lower strength and therefore is easily deformable, so U.S. Pat. No. 6,360,807 has to make use of seed polymerization process. Therefore, the process is compocatedly operated, it is difficult to control the product quality, and the production cost and the plant investment are high.

In recent years, a lost foam (expandable pattern) casting (EPC) technology is increasingly used in casting technology, which is a new technique without residuals and with excellent moulding accuracy. Since a readily volatizable foam is used as mold pattern, it is unnecessary to take out the mold, any mold joint and any sand core are eliminated, the dimensional error caused due to the assembly of the core mold blocks is reduced. The dimensional accuracy and the surface roughness are comparable to the ones in investment casting. Since the eliminated pattern casting uses a dry sand molding process, the defects caused by water, adhesive and other additive present in the sand are eliminated and casting reject ratio is substantially reduced. Secondly, lost foam casting is easy to be performed cleanly. The pattern degradation when casting causes a little organic emission, which amounts to about 0.3% based on the weight of the poured molten iron, however accounts to about 5% in case of self-hardened sand. At the same time, the emission may be completed within a short time at a concentrated place. That is to say, the lost foam casting technique is also environmentally friendly. In addition, almost all the casting sand can be reused, for example up to more than 97%, omitting the operating system for the formulation molding sand and the recycle of the used sand. Thirdly, a lost foam casting allows a high degree of design freedom and an integration of several components into one casting, internal channels or openings can be included in the foam pattern to be cast directly, therefore machining cost and assembly cost can be reduced greatly. Generally speaking, by means of EPC process the equipment cost can be lowered by 30–50% and casting cost is reduced by 10–39%. Because of the possibility of carbon pickup, the process employing expandable polystyrene (EPS) pattern is not suitable for black metal casting since the carbon-rich benzene structure in EPS molecule is thermodynamically stable and difficult to be decomposed; Furthermore, the EPS decomposition leads to a plenty of liquid, which is contacted with molten metal for a long time, making carbon-hydrogen bond of benzene ring structure be cracked to form carbon residual and therefore increasing the possibility of carbon being captured by liquid metal in mold. In summary, the EPS mold has a main disadvantage of carbon pickup defect in casting.

CONTENTS OF THE INVENTION

The purpose of the application is to overcome the defects of the prior art, i.e. effectively solve the problem of a lower molecular weight of the foamable copolymer resin, obtain a product comparative to or superior to the foamable copolymer resin prepared by a seed polymerization or "two-step process" of the prior art, by selecting the constituting ratio of the mixed monomers and selecting one or more additives under the conditions that "one-step process" is employed in preparing process.

In eliminated pattern casting process, pattern manufacturing is very critical. Selection of starting materials and manufacturing process is very important for obtaining a pattern having a low density, an accurate size and a smooth surface and therefore for obtaining good castings. For this purpose, the applicant is trying to achieve the following results on designing the eliminated pattern casting molding material: 1. the evaporating temperature and the emitted gas amount should be low; 2. the evaporation should be carried out rapidly and completely without any residuals; 3. the materials should have low density, good strength and stiffness in order that the pattern maintains undamaged during its preparation, its transport and the filling of dry sand in mold, thereby ensuring the size and form of the pattern stable; 4. in order to solve the problems which are existing in preparing a foamable resin by means of "one-step process", for example, that the prepared copolymer resin has a lower molecular weight and the resultant resin foam has a lower strength and therefore is easily deformable, the applicant has made a careful and extensive study and found that if divinyl benzene (DVB) or ethylene glycol dirnethacrylate (DMAE) or $C_8$–$C_{12}$-alkyl mercaptan or carbon tetrabromide or carbon tetrachloride as a modifying agent is mixed with the mixed monomers to carry out one-step polymerization, the resultant foamable copolymer resin product would have a greatly improved molecular weight, good performance and quality, leading to an excellent operability—with which one may produce a foam pattern having smooth surface and high strength, therefore obtaining excellent lost foam castings; 5. by selection of type and amount of the modifying aid in the composition, the constituting ratio of the polymerizating materials of the invention is fully different from the prior art, the resultant product has a different molecular structure and good suitability, meeting the need of the user.

It was found that the object of the invention can be reached by the following embodiments:

According to one aspect of the invention, there is provided a foamable copolymer resin which comprises in parts by weight (pbw) from 40 to 49 of methyl methacrylate, from 51 to 60 of styrene, from 180 to 220 of deionized water, from 0.25 to 0.55 of a dispersant, from 10 to 14 of a foaming agent, from 0.35 to 0.75 of an initiator and from 0.2 to 0.5 of a modifying aid.

According to another aspect of the invention, there is provided a foamable copolymer resin which comprises in parts by weight from 91 to 95 of methyl methacrylate, from 5 to 9 of styrene, from 230 to 270 of deionized water, from 0.4 to 0.6 of a dispersant, from 13 to 15 of a foaming agent, from 0.25 to 0.65 of an initiator and from 0.5 to 1.0 of a modifying aid.

According to further aspect of the invention, there is provided a foamable copolymer resin which comprises in parts by weight 70 of methyl methacrylate, 30 of styrene, from 180 to 220 of deionized water, from 0.3 to 0.6 of a dispersant, from 8 to 15 of a foaming agent, from 0.3 to 0.8 of an initiator and from 0.35 to 0.60 of a modifying aid.

In the above said embodiments, an organic peroxide may be used as an initiator, like benzoyl peroxide (BPO) and tert-butyl perbenzoate (TBPB); the used foaming agent is pentane or isohexane or petroleum ether; the used modifying aid is divinyl benzene (DVB) or ethylene glycol dimethacrylate (DMAE) or $C_8$-$C_{12}$-alkyl mercaptane or carbon tetrabromide or carbon tetrachloride; The dispersant is cellulose ether like hydroxy ethyl cellulose or hydroxylpropyl cellulose ether etc. Preferably, the copolymer resin according to the invention comprises in parts by weight 49 of methyl methacrylate, 51 of styrene, 225 of deionized water, 0.45 of a despersant, 11.5 of a foaming agent, 0.55 of an initiator and 0.45 of a modifying aid.

Alternatively, the copolymer resin according to the invention preferably comprises in parts by weight 91 of methyl methacrylate, 9 of styrene, 250 of deionized water, 0.6 a dispersant, 15 of a foaming agent, 0.45 of an initiator and 0.8 of a modifying aid.

Alternatively, the copolymer resin according to the invention preferably comprises in parts by weight 70 of methyl methacrylate, 30 of styrene, 200 of deionized water, 0.35 of a dispersant, 12 of a foaming agent, 0.5 of an initiator and 0.65 of a modifying aid.

The new foamable copolymer resin according to the invention has the formula as follows:

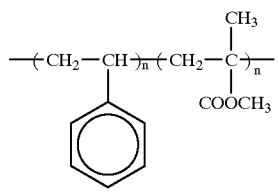

According to the present invention, there is also provided a process for preparing a new foamable copolymer resin, which comprises firstly adding an organic peroxide initiator, a modifying aid and a foaming agent to the mixed monomers of methyl methacrylate and styrene so as to constitute a homogenous mixture; at the same time charging the deionized water into a polymerization reactor and adding a dispersant with stirring to produce a homogenous mixture, then sealing the reactor and introducing $N_2$ gas to purge the reactor before the above homogenous monomer mixture is added. The polymerization is carried out at a temperature of from 60 to 105 and a pressure of from 0.3 to 0.8 MPa for about 15 to 22 hours. After the completion of the reaction the residue is washed with water and dewatered, dried at a temperature of less than 40 to obtain foamable resin pellets.

When drying the resin mixture a lubricant is added in an amount of not more than 1% by weight. The resultant copolymer resin has a particle size of 0.2 to 0.8 mm.

Compared to the prior art, the invention is different in that the foaming agent is added to the mixed monomers before the start of the polymerization and then they are together introduced to the reactor and in that several additives are introduced during the polymerization. The invention overcomes the defect that the polymer has a too low molecular weight, which is present in "one-step process" of the prior art. In the invention, the molecular weight of the copolymer may be controlled in a range between 150,000 to 300,000. Furthermore, The process of the invention has such advantages as: short procedure, easily operated, low production cost, reduced energy consumption and less apparatus investment. Since the constituting ratio of the polymerizating materials of the invention is fully different from the prior art, the resultant product has a different molecular structure and good suitability. With this kind of resin, the apparatus and the process similar to the ones used in EPS pattern manufacturing may be used to produce lost foam casting pattern and excellent castings.

EXAMPLES

In all the examples, the amount value is represented in parts by weight, unless otherwise indicated.

Example 1

0.5 of an initiator, 0.65 of a modifying aid and 12 of a foaming agent are added to the mixed monomers of 70 of methyl methacrylate and 30 of styrene, in order to constitute a homogenous mixture; at the same time 200 of a deionized water is charged into a polymerization reactor and 0.35 of a dispersant is added with stirring to produce a homogenous mixture, then the reactor is sealed and purged by introducing $N_2$ gas before the above homogenous monomer mixture is added. The used initiator is benzoyl peroxide (BPO) or tert-butyl perbenzoate (TBPB); the used foaming agent is pentane or isohexane or petroleum ether; the used modifying aid is divinyl benzene (DVB) or ethylene glycol dimethacrylate (DMAE) or $C_8$-$C_{12}$-alkyl mercaptan or carbon tetrabromide or carbon tetrachloride; The dispersant is hydroxy ethyl cellulose or hydroxylpropyl cellulose ether.

Example 2

Example 1 is repeated, with the exception that the amount of the deionized water is 180, the one of the dispersant is 0.6, the foaming agent is 8, the initiator is 0.3 and the modifying agent is 0.35.

Example 3

Example 1 is repeated, with the exception that the amount of the deionized water is 220, the one of the dispersant is 0.3, the foaming agent is 15, the initiator is 0.8 and the modifying agent is 0.65.

Example 4

0.45 of an initiator, 0.8 of a modifying aid and 15 of a foaming agent are added to the mixed monomers of 95 of methyl methacrylate and 5 of styrene, in order to constitute a homogenous mixture; at the same time 250 of a deionized water is charged into a polymerization reactor and 0.6 of a dispersant is added with stirring to produce a homogenous mixture, then the reactor is sealed and purged by introducing $N_2$ gas before the above homogenous monomer mixture is added. The used initiator is benzoyl peroxide (BPO) or tert-butyl perbenzoate (TBPB); the used foaming agent is pentane or isohexane or petroleum ether; the used modifying aid is divinyl benzene (DVB) or ethylene glycol dimethacrylate (DMAE) and $C_8$–$C_{12}$-alkyl mercaptan or carbon tetrabromide or carbon tetrachloride; The used dispersant may be hydroxy ethyl celloluse or hydroxylpropyl cellulose ether.

Example 5

Example 4 is repeated, with the exception that the components and their amounts are as follows:
MMA 91
ST 9
the deionized water 270
the dispersant 0.6
the foaming agent 14
the initiator 0.65, and
the modifying aid 1.0.

Example 6

Example 4 is repeated, with the exception that the components and their amounts are as follows:
MMA 93
ST 7
the deionized water 230
the dispersant 0.4
the foaming agent 13
the initiator 0.25 and
the modifying aid 0.5.

Example 7

0.55 of an initiator, 0.45 of a modifying aid and 11.5 of a foaming agent are added to the mixed monomers of 40 of methyl methacrylate and 60 of styrene, in order to constitute a homogenous mixture; at the same time 225 of a deionized water is charged into a polymerization reactor and 0.45 of a dispersant is added with stirring to produce a homogenous mixture, then the reactor is sealed and purged by introducing $N_2$ gas before the above homogenous monomer mixture is added. The used initiator is benzoyl peroxide (BPO) or tert-butyl perbenzoate (TBPB); the used foaming agent is pentane or isohexane or petroleum ether; the used modifying aid is divinyl benzene (DVB) or ethylene glycol dimethacrylate (DMAE) or $C_8$–$C_{12}$-alkyl mercaptan or carbon tetrabromide or carbon tetrachloride; The used dispersant may be hydroxy ethyl celloluse or hydroxylpropyl cellulose ether.

Example 8

Example 7 is repeated, with the exception that the components and their amounts are as follows:
MMA 45
ST 55
the deionized water 200
the dispersant 0.25
the foaming agent 14
the initiator 0.35 and
the modifying aid 0.2.

Example 9

Example 7 is repeated, with the exception that the components and their amounts are as follows:
MMA 49
ST 51
the deionized water 180
the dispersant 0.55
the foaming agent 10
the initiator 0.75 and
the modifying aid 0.5.

The foamable copolymer resin respectively prepared in the above said examples has a particle size of 0.2–0.8 mm and is sieved and divided into five grades according to different particle sizes. They are used for an eliminated pattern casting molding process, which is represented by the following diagram:

Starting foam pellets prefoaming drying and curing molding and foaming foam pattern Usually, the type of the starting foam pellets is selected according to the casting material and the quality requirement and the specification of the pellets is selected according to the minimum thickness of the wall of the castings.

The prefoaming of the pellets for an eliminated pattern casting is carried out generally using a patch prefoamer, like steam prefoamer and vacuum prefoamer.

The prefoamed pellets are dried typically using a fluidized bed at a temperature of 25–35 C. until the water content of the pellets is dropped to less than 2%; the inside of the prefoamed pellets is in a vacuum state and the pellets has to be aged for a while to be stable.

The prefoamed pellets are then molded and foamed by any customary means, for example, using steam molding and press molding processes.

The obtained copolyiner resin and the pattern produced from the same include the following test data, see the table:

|  | examples | | | | | | | | |
| --- | --- | --- | --- | --- | --- | --- | --- | --- | --- |
|  | 1 | 2 | 3 | 4 | 5 | 6 | 7 | 8 | 9 |
| Starting pellets |  |  |  |  |  |  |  |  |  |
| Molecular weight Mw ($\times 10^4$) | 25.6 | 28.0 | 26.4 | 22.0 | 20.5 | 25.0 | 25.6 | 27.0 | 24.5 |
| Average particle size (mm) | 0.57 | 0.45 | 0.60 | 0.50 | 0.46 | 0.45 | 0.58 | 0.63 | 0.53 |
| Volatiles (%) | 9.5 | 7.0 | 10.5 | 11.3 | 11.1 | 11.0 | 9.8 | 10.7 | 8.5 |
| Prefoamed pellets *1 |  |  |  |  |  |  |  |  |  |
| Prefoaming temperature (° C.) | 98 | 98 | 98 | 110 | 110 | 110 | 95 | 95 | 95 |

-continued

| | examples | | | | | | | | |
|---|---|---|---|---|---|---|---|---|---|
| | 1 | 2 | 3 | 4 | 5 | 6 | 7 | 8 | 9 |
| Heating time (min) | 21 | 19 | 25 | 45 | 45 | 41 | 19 | 22 | 24 |
| Apparent density (g/l) | 22.0 | 25.0 | 20.0 | 25.0 | 23.5 | 26.0 | 19.5 | 22.0 | 24.0 |
| Pellet shrinkage | no | no | no | no | no | no | no | no | no |
| Molded pattern | | | | | | | | | |
| Surface Smoothness | excellent | excellent | excellent | excellent | excellent | excellent | excellent | excellent | excellent |
| Pattern shrinkage (%) | 0.20 | 0.20 | 0.20 | 0.15 | 0.15 | 0.15 | 0.25 | 0.25 | 0.25 |
| Casting performance | | | | | | | | | |
| casting | | | | | | | | | |
| Carbon defect *2 | no | no | no | / | / | / | no | no | no |
| Appearance & size accuracy | excellent | excellent | excellent | / | / | / | excellent | excellent | excellent |
| Cast steel *3 | | | | | | | | | |
| Carbon pickup (%) | 0.20 | 0.20 | 0.20 | 0.10 | 0.10 | 0.10 | / | / | / |
| Appearance & size accuracy | excellent | excellent | excellent | excellent | excellent | excellent | / | / | / | note
*1 prefoamer type: SJ-KF-450
*2 carbon pickup on surface and inside of the casting
*3 carbon content in steel 0.25%

What is claimed is:

1. A suspension for use in forming a foamable copolymer resin, the suspension comprising the following components: methyl methacrylate and styrene monomers, an initiator comprising an organic peroxide selected from the group consisting of benzoyl peroxide and tert-butyl perbenzoate, a foaming agent selected from the group consisting of pentane, isohexane and petroleum ether, a modifying aid comprising divinyl benzene or ethylene glycol dimethecrylate and a compound selected from the group consisting of $C_8$–$C_{12}$-alkyl mercaptan, carbon tetrabromide and carbon tetrachloride, a dispersant comprising a cellulose ether selected from the group consisting of hydroxy ethyl cellulose and hydroxylpropyl cellulose ether, and deionized water, the components being present in the suspension in parts by weight as follows:
   a) 40 to 49 of the methyl methacrylate monomer, 51 to 60 of the styrene monomer, 180 to 225 of the deionized water, 0.25 to 0.55 of the dispersant, 10 to 14 of the foaming agent, 0.35 to 0.75 of the initiator and 0.2 to 0.5 of the modifying aid; or
   b) 91 to 95 of the methyl methacrylate monomer, 5 to 9 of the styrene monomer, 230 to 270 of the deionized water, 0.4 to 0.6 of the dispersant, 13 to 15 of the foaming agent, 0.25 to 0.65 of the initiator and 0.5 to 1.0 of the modifying aid; or
   c) 70 of the methyl methacrylate monomer, 30 of the styrene monomer, 180 to 220 of the deionized water, 0.3 to 0.6 of the dispersant, 8 to 15 of the foaming agent, 0.3 to 0.8 of the initiator and 0.35 to 0.60 of the modifying aid.

2. The suspension according to claim 1, wherein the components are present in the suspension in parts by weight as follows:
   a) 49 of the methyl methacrylate monomer, 51 of the styrene monomer, 225 of the deionized water, 0.45 of the dispersant, 11.5 of the foaming agent, 0.55 of the initiator and 0.45 of the modifying aid; or
   b) 91 of the methyl methacrylate monomer, 9 of the styrene monomer, 250 of the deionized water, 0.6 of the dispersant, 15 of the foaming agent, 0.45 of the initiator and 0.8 of the modifying aid; or
   c) 70 of the methyl methacrylate monomer, 30 of the styrene monomer, 200 of the deionized water, 0.35 of the dispersant, 12 of the foaming agent, 0.5 of the initiator and 0.65 of the modifying aid.

3. The suspension according to claim 1, wherein the components are present in the suspension in parts by weight as follows:
   40 to 49 of the methyl methacrylate monomer, 51 to 60 of the styrene monomer, 180 to 225 of the deionized water, 0.25 to 0.55 of the dispersant, 10 to 14 of the foaming agent, 0.35 to 0.75 of the initiator and 0.2 to 0.5 of the modifying aid.

4. The suspension according to claim 1, wherein the components are present in the suspension in parts by weight as follows:
   91 to 95 of the methyl methacrylate monomer, 5 to 9 of the styrene monomer, 230 to 270 of the deionized water, 0.4 to 0.6 of the dispersant, 13 to 15 of the foaming agent, 0.25 to 0.65 of the initiator and 0.5 to 1.0 of the modifying aid.

5. The suspension according to claim 1, wherein the components are present in the suspension in parts by weight as follows:

70 of the methyl methacrylate monomer, 30 of the styrene monomer, 180 to 220 of the deionized water, 0.3 to 0.6 of the dispersant, 8 to 15 of the foaming agent, 0.3 to 0.8 of the initiator and 0.35 to 0.60 of the modifying aid.

6. The suspension according to claim 3, wherein the suspension consists essentially of said components.

7. The suspension according to claim 4, wherein the suspension consists essentially of said components.

8. The suspension according to claim 5, wherein the suspension consists essentially of said components.

9. A process for preparing a foamable copolymer resin comprising:

a) providing a homogeneous monomer mixture comprising methyl methacrylate and styrene monomers, an organic peroxide initiator selected from the group consisting of benzoyl peroxide and tert-butyl perbenzoate, a modifying aid comprising divinyl benzene or ethylene glycol dimethacrylate and a compound selected from the group consisting of $C_8$–$C_{12}$-alkyl mercaptan, carbon tetrabromide and carbon tetrachloride, and a foaming agent selected from the group consisting of pentane, isohexane and petroleum ether;

b) providing a polymerization reactor comprising a mixture of deionized water and a dispersant, the dispersant being a cellulose ether selected from the group consisting of hydroxy ethyl cellulose and hydroxylpropyl cellulose ether, and purging the reactor with nitrogen gas;

c) adding the homogeneous monomer mixture to mixture in the polymerization reactor under conditions that promote a reaction of the monomers with formation of the foamable copolymer resin, said conditions comprising a temperature of 60–105° C. and a pressure of 0.3–0.8 MPa for a time sufficient to complete the reaction; and d) recovering the resin.

10. The process according to claim 9, further comprising the step of:

e) washing the resin with water, dewatering the washed resin, and drying the dewatered resin at a temperature of less than 40° C. to obtain foamable pellets.

11. The process according to claim 9, further comprising the step of:

e) washing the resin with water, dewatering the washed resin and drying the dewatered resin at a temperature of less than 40° C. and mixing the dried resin with a lubricant in an amount of not more than 1% by weight to form a resultant resin, the resultant resin having a particle size of 0.2 to 0.8 mm.

12. The process according to claim 9, wherein the process consists essentially of said steps (a)–(d).

13. The process according to claim 10, wherein the process consists essentially of said steps (a)–(e).

14. The process according to claim 11, wherein the process consists essentially of said steps (a)–(e).

15. The process according to claim 9, wherein, upon addition of the homogeneous monomer mixture to the mixture in the polymerization reactor in step c the reactor consists essentially of the following components in parts by weight:

40 to 49 of the methacrylate monomer, 51 to 60 of the styrene monomer, 180 to 225 of the deionized water, 0.25 to 0.55 of the dispersant, 10 to 14 of the foaming agent, 0.35 to 0.75 of the initiator and 0.2 to 0.5 of the modifying aid.

16. The process according to claim 9, wherein, upon addition of the homogeneous monomer to the mixture in the polymerization reactor in step c, the reactor consists essentially of the followig components in parts by weight: 91 to 95 of the methyl methacrylate monomer, 5 to 9 of the styrene monomer, 230 to 270 of the deionized water, 0.4 to 0.6 of the dispersant, 13 to 15 of the foaming agent, 0.25 to 0.65 of the initiator and 0.5 to 1.0 of the modifying aid.

17. The process according to claim 9, wherein, upon addition of the homogeneous monomer to the mixture in the polymerization reactor in step c, the reactor consists essentially of the following components in parts by weight: 70 of the methyl methacrylate monomer, 30 of the styrene monomer, 180 to 220 of the deionized water, 0.3 to 0.6 of the dispersant, 8 to 15 of the foaming agent, 0.3 to 0.8 of the initiator and 0.35 to 0.60 of the modifying aid.

18. The foamable copolymer resin produced by the process according to claim 15.

19. The foamable copolymer resin produced by the process according to claim 16.

20. The foamable copolymer resin produced by the process according to claim 17.

* * * * *